United States Patent

Murphy et al.

[11] 4,011,492
[45] Mar. 8, 1977

[54] CHOPPER MOTOR CONTROLLER HAVING PULSE-BY-PULSE SENSING OF PLUGGING

[75] Inventors: Howard G. Murphy, Greendale, Wis.; Harvey E. Schmidt, Chicago Heights, Ill.; Thomas P. Gilmore, Wauwatosa, Wis.

[73] Assignee: Allis-Chalmers Corporation, Milwaukee, Wis.

[22] Filed: Dec. 29, 1975

[21] Appl. No.: 644,880

[52] U.S. Cl. .............................. 318/373; 318/139; 318/341

[51] Int. Cl.² ......................................... H02P 3/10

[58] Field of Search .......... 318/139, 331, 341, 373, 318/258, 261, 345

[56] References Cited

UNITED STATES PATENTS

| 3,188,545 | 6/1965 | Sheheen | 318/261 |
| 3,828,235 | 8/1974 | Price et al. | 318/373 |
| 3,855,520 | 12/1974 | Stich | 323/19 |
| 3,872,367 | 3/1975 | Kuriyama et al. | 318/373 |
| 3,958,163 | 4/1976 | Clark | 318/373 |

Primary Examiner—Gene Z. Rubinson
Assistant Examiner—Michael Mutter
Attorney, Agent, or Firm—Lee H. Kaiser

[57] ABSTRACT

A pulse width modulation chopper controller for a D.C. traction motor has plug sensing means which monitors the voltage across the motor armature on a pulse-by-pulse basis and is responsive, only when the power switch is turned on, to the motor acting as a generator to limit the "on-time" of the power switch before current of high magnitude can flow in the motor.

13 Claims, 1 Drawing Figure

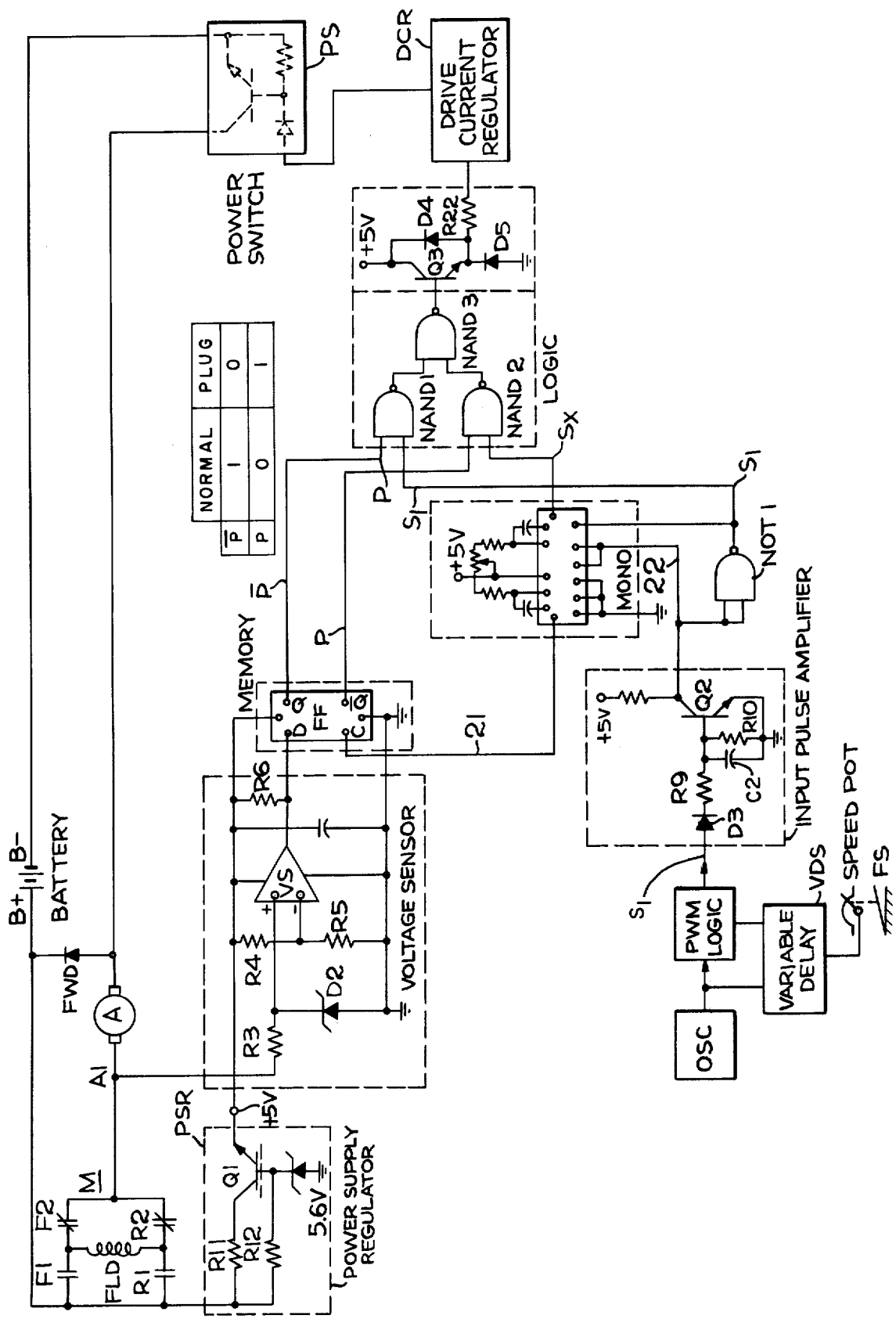

CHOPPER MOTOR CONTROLLER HAVING PULSE-BY-PULSE SENSING OF PLUGGING

This invention relates to variable time ratio motor controllers and in particularly to variable time ratio controls for a D.C. vehicle traction motor having plug sensing means.

BACKGROUND OF THE INVENTION

Variable time ratio controls are known for D.C. traction motors energized from a battery wherein a semiconductor power switch is switched rapidly between the "on" state and the "off" state to selectively vary the average voltage applied to the motor and thus regulate its speed. Such time ratio controls may be of the pulse width modulation type wherein variable width constant frequency pulses are applied to the motor in order to vary the duty cycle of the power switch, or may be of the frequency modulation type wherein a controlled rectifier power switch is gated on at an adjustable frequency by a relaxation oscillator to vary the average power input to the motor. A free-wheeling diode is commonly connected in shunt to the inductive motor circuit to provide a path for the inductive current when the semiconductor power switch is open and thus prevent abrupt current change and resultant high voltage across the power switch. Such free-wheeling diode shunting the series combination of motor armature and field winding maintains the flow of current to the motor during the interpulse period and reduces motor ripple current. An armature diode is commonly connected in shunt to the motor armature and provides a path for armature current flow during braking.

It is often desirable to dynamically brake, or plug, a D.C. traction motor by reversing the connection to the motor field while it is coasting so that the motor acts as a generator with the polarity reversed while the vehicle is still going forward. Very high magnitudes of current flow in the motor during plugging which may cause jolts and jerking of the vehicle and also shorten motor brush life. Plug sensing circuits are known which detect a plug condition and limit the on-time of the semiconductor power switch in response thereto in an attempt to prevent damage to the brushes and bring the motor to a smooth stop. However, known plug sensing circuits, such as those which detect average armature voltage or are responsive to a predetermined magnitude of current through the armature diode, are relatively slow and inaccurate in sensing and do not respond with sufficient speed to limit on-time of the power switch before high magnitudes of current flow in the motor.

OBJECTS OF THE INVENTION

It is an object of the invention to provide an improved rapidly responsive plug sensing circuit for a D.C. traction motor which monitors the motoring or generating condition of the motor on a pulse-by-pulse basis and quickly provides plug-condition information to the chopper controller in order to limit on-time of the semiconductor power switch before high magnitudes of current flow in the motor.

It is another object of the invention to provide such an improved plug sensing circuit which monitors the motor armature voltage each time the semiconductor power switch is turned on by a PWM pulse and provides fast plug-condition information to the chopper controller so that the PWM pulse which triggers the power switch can be terminated if the motor is acting as a generator.

DESCRIPTION OF THE DRAWINGS

These and other objects and advantages of the invention will be more readily apparent from the following detailed description when considered in conjunction with the single FIGURE of the accompanying drawing which is a schematic circuit diagram of a chopper motor-controller embodying the invention and representing known components in block form.

SUMMARY OF THE INVENTION

A chopper motor-controller for regulating the speed of a D.C. traction motor has means for generating a succession of pulses of selectively variable width for turning a semiconductor power switch in series with the motor on and off in order to regulate the speed of the motor; voltage sensor means for monitoring the voltage across the armature of the motor and being adapted, when enabled, to derive a plugging signal if the motor is acting as a generator and the voltage across its armature is below a predetermined magnitude; monostable multivibrator means triggered by each variable width pulse to enable the voltage sensor means and to also derive a short time duration pulse; and logic gate means for respectively coupling the short duration pulses and the variable width pulses to the power switch in response to the presence and to the absence of the plugging signal. In a preferred embodiment the voltage sensor means which is only turned on when the power switch is conducting includes an operational amplifier receiving as inputs: (a) the voltage across the motor armature, and (b) the voltage of predetermined magnitude, and also includes a clocked flip-flop which receives the output from the operational amplifier on its "data" input and transfers the information on its data input to its Q output to generate the plugging signal when the motor is generating and a clock signal is applied to its clock input by the monostable multivibrator as it is triggered by each variable width pulse. The logic gate means of the preferred embodiment includes first and second NAND logic gates which respectively receive as inputs the variable width pulses and the short duration pulses and also respectively receive as inputs the Q and Q̄ flip-flop outputs (i.e., the plugging signal and its negation when the motor is generating).

DETAILED DESCRIPTION

Referring to the single FIGURE of the drawing, a pulse width modulation (PWM) chopper embodying the invention for a D.C. series traction motor M has an armature A and a field winding FLD for driving the wheels of a fork lift truck (not shown). Armature A may be connected in series with field winding FLD and a semiconductor power switch PS across the terminals B+, B− of a battery BATT either through the contacts F1 of a forward contactor and R2 of a reverse contactor to drive motor M in a direction to propel the truck forward, or alternatively through the contacts R1 of the reverse contactor and contacts F2 of the forward contactor to reverse the polarity of field winding FLD and the direction of motor M and propel the lift truck to the rear. A diode FWD in parallel to the inductive motor path provides a circuit for the inductive motor current during the interpulse period when power switch PS is turned off.

Motor M is energized by unidirectional pulses of current from battery BATT conducted by power switch PS, and the speed of motor M is regulated by the PWM chopper which controls the selectively variable width pulses applied to motor M to proportionally vary the average power to motor M and includes an oscillator OSC shown in block form which generates a train of pulses that establish the frequency of the PWM chopper. As disclosed in U.S. Pat. No. 3,855,520 in the name of F. A. Stich and having the same assignee as this invention, each pulse from oscillator OSC may be coupled to a PWM LOGIC circuit shown in block form to "set" a bistable latch therein (not shown) which, in response thereto, generates the leading edge of a variable width PWM pulse that is coupled over a lead $S_1$ to a drive current regulator DCR (also shown in block form) to turn on power switch PS and thus initiate a variable width current pulse to motor M. The path between PWM LOGIC circuit and drive current regulator DCR is described hereinafter. Each pulse from oscillator OSC is also coupled to a variable delay circuits VDS shown in block form to initiate a time delay interval. After a selectively variable time delay determined by the setting of a speed potentiometer SPEED POT whose wiper is controlled by a foot pedal FS on the lift truck, variable delay circuits VDS provides an output pulse to PWM LOGIC circuit which "resets" the bistable latch therein and terminates the PWM pulse to drive current regulator DCR to turn off power switch PS. The "on-time" and the power duty cycle of power switch PS is thus controlled by the time delay of variable delay circuit VDS and is a function of the setting of speed potentiometer SPEED POT.

Power switch PS may comprise a plurality of NPN transistors (only one being shown in dotted lines) having their collectors paralleled and connected to one side of armature A and their emitters paralleled and connected to battery terminal B—. Drive current regulator DCR is preferably a constant current switching regulator that supplies constant base drive through a diode D5 to the base of the NPN transistor power switch PS.

A voltage sensor circuit including an operational amplifier VS monitors the voltage across armature A each time power switch PS is turned on in order to detect whether motor M is motoring or generating. Terminal A1 at one side of armature A is coupled through a resistance R3 to the noninverting input of operational amplifier VS which compares the motor voltage at A1 to a predetermined reference voltage applied to the amplifier inverting input. A voltage divider comprising two series resistances R4 and R5 is connected between a positive voltage supply +5v and ground, and the junction between R4 and R5 is coupled to the inverting input of voltage sensor amplifier VS to preferably apply a two volt positive reference potential thereto. A Zener diode D2 connected between the noninverting input of amplifier VS and ground limits the voltage from armature A that can be applied to the amplifier. The output of operational amplifier VS is applied to the data (D) input of a clocked memory type D flip-flop, or latch FF which transfers the information on its data (D) input to its Q output on the leading edge of a clock pulse applied to its clock (C) input. If motor M is operating as a motor, the voltage across sensor VS will be logical one. During plugging motor M acts as a generator with its polarity reversed, so the potential at terminal A1 falls below the two volt reference potential applied to the inverting input and amplifier VS generates a logical zero output signal which is coupled to the data (D) input of flip-flop FF.

Flip-flop FF provides a logical zero plugging signal P on its Q output when motor M is generating and provides its negation $\bar{P}$ on the $\bar{Q}$ output when motor M is motoring. Flip-flop FF is clocked so that the output of voltage sensor VS is only monitored, or sampled when power switch PS is turned on. A monostable multivibrator, or one-shot MONO is triggered to its unstable condition each time the PWM LOGIC circuit initiates a variable width PWM pulse on the $S_1$ lead and in response thereto generates, preferably after a time delay, a clock pulse which is applied over a lead 21 to the clock (C) input of flip-flop FF.

The variable width PWM pulses from the PWM LOGIC circuit on lead $S_1$ are coupled through a diode D3 and a resistance R9 to the base of a input pulse amplifier transistor Q2 and turn it on. A capacitor C2 connected between the base of Q2 and ground eliminates high frequency noise. The output at the collector of Q2 is coupled over a lead 22 to an input of monostable multivibrator MONO to trigger it to the unstable state and is also coupled through an inverter, or logic gate NOT 1 to one input of a logic gate NAND 1 of the LOGIC circuit.

One-shot MONO is shown in the drawing as an integrated circuit of the type designated 8602 commercially available from Motorola Corporation and provides two outputs when it is triggered to its unstable state. The first output from MONO is a short pulse $S_x$ of fixed duration applied over lead $S_x$ to one input of a logic gate NAND 2 of the LOGIC circuit and is used to limit on-time of power switch PS during plugging. The second output from MONO is a clock pulse, which is applied (after a slight time delay to eliminate transients and to allow power switch PS to turn on fully before the armature voltage is monitored) to the clock input (C) of memory flip-flop FF.

The LOGIC circuit includes three logic gates NAND 1, NAND 2, and NAND 3. NAND 1 receives as inputs: (1) the Q output from flip-flop FF, and (2) the output from gate NOT 1 which is the PWM variable width pulse and thus is given the same designation $S_1$ as the output from PWM LOGIC; NAND 2 receives as inputs: (1) the $\bar{Q}$ output from flip-flop FF, and (2) the short time duration pulse $S_x$ from one-shot MONO. The outputs from NAND 1 and NAND 2 are inputs to logic gate NAND 3, and the output of NAND 3 is coupled to the base of an output buffer amplifier transistor Q3 which is connected as an emitter follower and whose output applied to drive current regulator DCR and thus controls the on and off time of power switch PS.

If the PWM pulses generated by PWM LOGIC are designated $S_1$ and logical 1 on the flip-flop Q and $\bar{Q}$ outputs were respectively represented by P and $\bar{P}$, the output $S_{out}$ from Q3 may be represented by the Boolean algebraic equation: $S_{out} = S_1 \bar{P} + S_x P$.

When motor M is motoring, variable width PWM pulses provided by PWM LOGIC circuit on lead $S_1$ are passed through the LOGIC circuit and drive current regulator DCR without modification. When motor M is motoring, the voltage at terminal A1 is high and the output of voltage sensor VS is logical one. Each PWM pulse on lead $S_1$ is passed by input pulse amplifier Q2 and triggers MONO and is also passed through gate NOT 1 which inverts it to logical 1 before it is applied to an input of gate NAND 1 of the LOGIC circuit.

When it is triggered at the leading edge of a PWM pulse, one-shot MONO generates a clock pulse on lead 21 which transfers the logical one output from voltage sensor VS to the Q output of memory flip-flop FF. Gate MAND 1 then responds to its two logical one inputs to generate a logical zero output whose width is equal to that of the PWM pulse. Logic gate NAND 2 receives logical zero input from Q output of flip-flop FF so it has a logical one output which is applied to gate NAND 3. The output of NAND 3 is thus a logical one pulse of the same width on the PWM pulse on lead $S_1$ and which turns on output buffer amplifier transistor Q3 to couple the PWM pulse to drive current regulator DCR so power switch PS is turned on for the duration of the PWM pulse generated by PWM LOGIC circuit.

When motor M is generating the voltage across armature A at terminal A1 drops below the two volt reference potential at the inverting input of voltage sensor amplifier VS so that the output of VS goes to logical zero. When one-shot MONO is triggered by the leading edge of a PWM pulse applied to lead $S_1$, it applies a clock signal to the C input to flip-flop FF which then transfers the logical 0 on its D input to its Q output and thus generates the logical zero plugging signal P. The logical zero plugging signal P from the Q output of FF is an input to gate NAND 1 of the LOGIC circuit and its output goes to logical one. The logical one on the Q output from flip-flop FF is coupled to one input of NAND 2 which receives the short duration pulses $S_x$ on its other input from one-shot MONO, and consequently the output from NAND 2 is a short time duration logical zero pulse. Since NAND 3 receives logical one from NAND 1 and short duration logical zero pulse $S_x$ from NAND 2, the output from NAND 3 is a short duration logical one pulse $S_x$ which turns on output buffer amplifier Q3 and is coupled to drive current regulator DCR to turn on power switch PS for the short duration of pulse $S_x$. Consequently, the on-time of power switch PS is limited during plugging when the motoring or generating condition of motor M is sampled adjacent the leading edge of each PWM pulse so that excessive current cannot flow in motor M when it is acting as a generator.

It will be appreciated that the disclosed arrangement senses armature voltage on pulse-by-pulse basis each time power switch PS is turned on and provides very fast information regarding the motoring or generating condition of the motor so that the on-time of the power switch PS can be limited immediately, thereby restricting the magnitude of current that can flow in the motor during plugging, increasing brush life, and providing smooth transition into plugging without jolts and jerks of the lift truck.

While only a single embodiment of our invention has been illustrated and described, many modifications and variations thereof will be readily apparent to those skilled in the art, and consequently, it should be understood that we do not intend to be limited to the particular embodiment shown and described.

The embodiments of the invention in which an exclusive property or privilege is claimed are defined as follows:

1. In combination with a reversible D.C. traction motor connected in series with a semiconductor power switch and having means for generating a train of enabling pulses for turning said power switch on and off to regulate the speed of said motor, motor plugging means comprising voltage sensor means for monitoring the voltage across the armature of said motor and when actuated, deriving a plugging signal if said voltage is below a predetermined value, means responsive to each said enabling pulse to actuate said voltage sensor means and to also generate a short time duration pulse, and logic means for respectively coupling said enabling pulses and said short time duration pulses to said power switch when said plugging signal is absent and when it is present.

2. In the combination of claim 1 wherein said means for generating a train of enabling pulses derives pulses of selectively variable width.

3. In the combination of claim 1 wherein said means to actuate said voltage sensor means and to generate a short time duration pulse includes a monostable multivibrator.

4. In the combination of claim 1 wherein said voltage sensor means includes an operational amplifier, a bistable device coupled to the output of said operational amplifier, and means for applying to respective inputs of said operational amplifier: (a) said predetermined voltage and (b) said voltage across said armature.

5. In the combination of claim 4 wherein said bistable device is a clocked flip-flop which derives said plugging signal, and wherein said means to actuate said voltage sensor means and to generate a short duration pulse includes a monostable multivibrator triggered by each said enabling pulse to generate said short duration pulse and to also derive a clock pulse for said flip-flop.

6. In the combination of claim 2 wherein said logic means includes first and second NAND logic gates which respectively receive as inputs said variable width pulses and said short duration pulses and also respectively receive as inputs said plugging signal and its negation.

7. In combination with a reversible D.C. traction motor connected in series with a semiconductor power switch and having means for deriving a train of pulses of selectively variable width for turning said power switch on and off to regulate the speed of said motor, motor plugging means comprising voltage sensor means responsive to each said variable width pulse to sample the voltage across the armature of said motor and to generate a plugging signal if said voltage is below a predetermined magnitude, monostable multivibrator means responsive to each variable width pulse to generate a short pulse of fixed duration, and logic gate means for respectively coupling said variable width pulses and said short duration pulses to said power switch in response to the absence and to the presence of said plugging signal.

8. In the combination of claim 7 wherein said voltage sensor means includes an operational amplifier and a clocked flip-flop receiving the output of said amplifier, means for applying to the inputs of said operational amplifier: (a) said voltage across the armature of said motor, and (b) said voltage of predetermined value, and wherein said monostable multivibrator means also generates a clock pulse for said flip-flop.

9. In the combination of claim 8 wherein said logic gate means includes first and second NAND logic gates which respectively receive as inputs said variable width pulses and said short duration pulses and also respectively receive as inputs said plugging signal and its inversion.

10. In combination with a vehicle driven by a reversible D.C. motor connected in series with a semiconductor power switch and having means for deriving a succession of pulses of selectively variable width for turning said power switch on and off to regulate the speed of said motor, motor plugging means comprising an operational amplifier, means for applying to the inputs of said operational amplifier respectively: (a) the voltage across the armature of said motor, and (b) a voltage of predetermined potential, a flip-flop receiving the output of said operational amplifier on its data input and being adapted to transfer the information on its data input to its Q input when a clock pulse is applied to its clock input, whereby said flip-flop generates a plugging signal when the voltage across said armature is below said predetermined potential, monostable multivibrator means triggered by each said variable width pulse to apply a clock pulse to the clock input of said flip-flop and also generate a short time duration pulse, and logic gate means responsive respectively to the presence and to the absence of said plugging signal for coupling said variable width pulses and coupling said short time durations pulses to said power switch whereby motor voltage is sampled only when said power switch is turned on and the on-time of the power switch is minimized before high magnitude of current can flow in the motor during plugging.

11. In the combination of claim 10 wherein said multivibrator means only generates said clock pulse after a time delay subsequent to being triggered by said variable width pulse.

12. In the combination of claim 10 wherein said logic gate means includes first and second NAND logic gates which respectively receive said variable width pulses and said short duration pulses as inputs and also receively receive said plugging signal and its negation as inputs.

13. In the combination of claim 12 wherein said logic gate means also includes a third NAND logic gate which receives the outputs of said first and second NAND gate as inputs.

* * * * *